United States Patent
Kulambi

(10) Patent No.: US 9,444,641 B2
(45) Date of Patent: Sep. 13, 2016

(54) MAC FLUSH OPTIMIZATIONS FOR ETHERNET RINGS

(71) Applicant: Brocade Communications Systems, Inc., San Jose, CA (US)

(72) Inventor: Sandeep Kulambi, Karnataka (IN)

(73) Assignee: Brocade Communications Systems, Inc., San Jose, CA (US)

(*) Notice: Subject to any disclaimer, the term of this patent is extended or adjusted under 35 U.S.C. 154(b) by 185 days.

(21) Appl. No.: 14/018,713

(22) Filed: Sep. 5, 2013

(65) Prior Publication Data

US 2014/0064061 A1    Mar. 6, 2014

Related U.S. Application Data

(60) Provisional application No. 61/811,112, filed on Apr. 11, 2013, provisional application No. 61/697,211, filed on Sep. 5, 2012.

(51) Int. Cl.
H04L 12/437    (2006.01)

(52) U.S. Cl.
CPC .................................. H04L 12/437 (2013.01)

(58) Field of Classification Search
CPC ..................................................... H04L 12/437
See application file for complete search history.

(56) References Cited

U.S. PATENT DOCUMENTS

| | | | |
|---|---|---|---|
| 6,330,229 B1 | 12/2001 | Jain et al. | |
| 6,717,922 B2 | 4/2004 | Hsu et al. | |
| 7,209,435 B1 | 4/2007 | Kuo et al. | |
| 7,558,205 B1 | 7/2009 | Moncada-Elias et al. | |
| 7,822,049 B1 | 10/2010 | Moncada-Elias et al. | |
| 8,699,380 B2* | 4/2014 | Kapitany et al. | 370/254 |
| 2007/0047471 A1 | 3/2007 | Florit et al. | |
| 2010/0177658 A1 | 7/2010 | Arai et al. | |
| 2010/0208623 A1 | 8/2010 | Kano | |
| 2011/0019536 A1 | 1/2011 | Kim et al. | |
| 2011/0044162 A1 | 2/2011 | Ryoo et al. | |
| 2011/0044166 A1 | 2/2011 | Lee et al. | |
| 2011/0158241 A1 | 6/2011 | Wang et al. | |
| 2011/0292833 A1 | 12/2011 | Kapitany et al. | |
| 2012/0170487 A1 | 7/2012 | Wu | |

(Continued)

OTHER PUBLICATIONS

U.S. Appl. No. 14/018,741 filed on Sep. 5, 2013 by Kulambi. (Unpublished. Available via USPTO's IFW System).

(Continued)

*Primary Examiner* — Jianye Wu
(74) *Attorney, Agent, or Firm* — Kilpatrick Townsend & Stockton LLP

(57) ABSTRACT

Techniques are identified for optimizing the MAC flush in Ethernet rings for faster traffic restoration. In one embodiment, flushing of MAC addresses is performed only once on receiving a first control message. For example, when a first control message is received, a network device may switch from a first state to a second state, which may indicate that the MAC addresses are not to be flushed if additional control messages are received. In another embodiment, flushing of MAC addresses is performed on one ring port rather than on both ring ports. For example, a flag field of a control message header may be used to determine on which port to flush. In another embodiment, flushing of MAC addresses is performed on only one ring port of an interconnection node. For example, the ring port can be determined using a flag field and possibly labels associated with the ring ports.

20 Claims, 7 Drawing Sheets

(56) References Cited

U.S. PATENT DOCUMENTS

| | | | |
|---|---|---|---|
| 2012/0317138 A1* | 12/2012 | Kitaichi et al. | ............... 707/769 |
| 2013/0177021 A1 | 7/2013 | Kitayama et al. | |
| 2014/0064060 A1 | 3/2014 | Kulambi | |
| 2015/0036544 A1 | 2/2015 | Singh | |
| 2015/0036546 A1 | 2/2015 | Singh | |
| 2016/0119220 A1 | 4/2016 | Singh | |

OTHER PUBLICATIONS

U.S. Appl. No. 13/954,861 filed on Jul. 30, 2013 by Singh. (Unpublished. Available via USPTO's IFW System).

U.S. Appl. No. 13/954,867 filed on Jul. 30, 2013 by Singh. (Unpublished. Available via USPTO's IFW System).

"Carrier Ethernet," Brocade, accessed Sep. 12, 2013 at http://www.brocade.com/solutions-technology/service-provider/carrier-ethernet/index.page, 2 pages.

"Ethernet ring protection switching," Recommendation ITU-T G.8032/Y.1344, International Telecommunication Union, Feb. 2012, 104 pages.

"Ethernet Ring Protection Switching," Wikipedia, accessed Sep. 12, 2013 at http://en.wikipedia.org/wiki/Ethernet_Ring_Protection_Switching, 3 pages.

"G.8032 Ethernet Ring Protection Overview," International Telecommunication Union, Mar. 2008, 23 pages.

Lee et al., "Flush Optimizations to Guarantee Less Transient Traffic in Ethernet Ring Protection," ETRI Journal, vol. 32, No. 2, Apr. 2010, pp. 184-194.

Rajagopal, "Achieving Superior Resiliency and Fast Convergence with Foundry's MRP," Foundry Networks, 8 pages.

Parker, "White Paper. Metro Ring Protocol (MRP)", © 2002 Foundry Networks, Inc., Apr. 2002, 6 pages (in color).

Raja Go Pal, "Achieving Superior Resiliency and Fast Convergence with Foundry's MRP", © 2002-2008 Foundry Networks, 8 pages (in color).

Notice of Allowance, dated May 6, 2015, for U.S. Appl. No. 13/954,861, filed Jul. 30, 2013, 17 pages.

Non-Final Office Action, dated Jun. 2, 2015, for U.S. Appl. No. 13/954,867, filed Jul. 30, 2013, 21 pages.

Non-Final Office Action, dated Aug. 18, 2015, for U.S. Appl. No. 14/018,741, filed Sep. 5, 2013, 32 pages.

Notice of Allowance, dated Aug. 31, 2015, for U.S. Appl. No. 13/954,861, filed Jul. 30, 2013, 4 pages.

Notice of Allowance, dated Dec. 23, 2015, for U.S. Appl. No. 13/954,867, filed Jul. 30, 2013, 14 pages.

Final Office Action dated Apr. 25, 2016, for U.S. Appl. No. 14/018,741, filed Sep. 5, 2013, 34 pages.

* cited by examiner

MAC FLUSH OPTIMIZATIONS FOR ETHERNET RINGS

CROSS-REFERENCES TO RELATED APPLICATIONS

The present application is a non-provisional of and claims the benefit and priority under 35 U.S.C. 119(e) of U.S. Provisional Application No. 61/697,211, filed on Sep. 5, 2012, and U.S. Provisional Application No. 61/811,112, filed on Apr. 11, 2013, each of which is herein incorporated by reference in its entirety for all purposes.

The present application is related to U.S. patent application Ser. No. 14/018,741, filed concurrently, and entitled MAC FLUSH OPTIMIZATIONS FOR ETHERNET RINGS, naming Kulambi, the entirety of which is herein incorporated by reference for all purposes.

BACKGROUND

Embodiments of the present invention relate to networking and more particularly to techniques for ring protection switching.

In a network, nodes interconnected by links can learn paths from various sources to various destinations over time. As these nodes learn such paths, the nodes can update internally stored tables in order to specify, for a data packet having a particular destination, the port of the node on which that data packet should be forwarded. When a link fails after such paths have been learned, at least some paths may need to be re-learned in order to compensate for the fact that paths containing the failed link are no longer viable; alternative paths will need to be learned in those cases.

The re-learning of paths following link failure can take a substantial amount of time, which is detrimental to the data-path switching performance within the network. Fortunately, the configuration of nodes using a protocol called Ethernet Ring Protection (ERP) protocol can somewhat simplify and quicken the re-learning process by confining relearning only over ring nodes of one ring. The Telecommunication Standardization Sector of the International Telecommunication Union (ITU-T) G.8032 Ethernet Ring Protection Switching (ERPS) standard defines the automatic protection switching (APS) protocol and protection switching mechanisms for Ethernet layer network (ETH) ring topologies, including details pertaining to ERP characteristics, architectures, and the ring APS (R-APS) protocol. An important aspect of deploying the G.8032 ERPS protocol to customers is its performance in detecting failure on a ring, such as a signal failure on one of the ports or a node failure, and restoring the traffic. Media access control (MAC) address flush is one of the most important factors that determine the time taken to restore the traffic.

BRIEF SUMMARY

Embodiments of the present invention relate to networking and more particularly to techniques for ring protection switching. In one embodiment, flushing of network device addresses is performed only once on receiving a first control message. For example, when a first R-APS Signal Failure (R-APS(SF)) message is received, a network device may switch from an Idle state to a Protection state, which may indicate that the MAC addresses are not to be flushed if additional R-APS(SF) messages are received. In another embodiment, flushing of network device addresses is performed on one of the ring ports rather than on both ring ports. For example, the port on which a MAC address flush is to be performed can be determined using a flag field, such as the flag field of the R-APS(SF) protocol data unit (PDU). In another embodiment, flushing of network device addresses is performed on one of the ring ports rather than on all three ring ports of an interconnection node. For example, the ring port on which a MAC address flush is to be performed can be determined using a flag field, such as the flag field of the R-APS(SF) PDU, and possibly labels associated with the three ring ports.

In one embodiment, a device includes memory and a processing unit. The memory is configurable to store address information of ports of a node, the ports including a first port and a second port both associated with a ring of nodes, the node configurable as a node in the ring, address information of a particular port identifying a set of one or more addresses associated with the particular port. The processing unit is configurable, in response to one of the ports receiving a control message in response to a failure on the ring, to cause address information of the first port to be cleared from the memory, without clearing address information of the second port from the memory, and cause the control message to be forwarded to a neighbor node of the ring of nodes. A flag of the forwarded control message indicates to the neighbor node which port to clear address information.

In certain embodiments, the processing unit may be further configurable, in response to one of the ports receiving the control message, to cause a blocked port of the ports to be unblocked to allow data message traffic using the unblocked port; and cause the flag of the forwarded control message to be set, wherein the set flag of the forwarded control message indicates to the neighbor node to clear address information of a port on which the forwarded control message is not received. The processing unit may be further configurable to determine the port on which the control message was received, wherein the processing unit is configurable to cause the control message to be forwarded to the neighbor node by causing the control message to be forwarded using a port of the ports that is not the determined port.

In certain embodiments, the processing unit may be further configurable to determine the port on which the control message was received; and determine whether a flag of the control message is set, wherein causing address information of the first port to be cleared further includes: if the flag of the control message is determined as not being set, causing address information of the determined port to be cleared, the first port being the determined port; and if the flag of the control message is determined as being set, causing address information of a port of the ports that is not the determined port to be cleared, the first port not being the determined port. The processing unit may be further configurable to: if the flag of the control message is determined as not being set, cause the control message to be forwarded to the neighbor node by causing the control message with the flag not set to be forwarded using the port of the ports that is not the determined port; and if the flag of the control message is determined as being set, cause the control message to be forwarded to the neighbor node by causing the control message with the flag set to be forwarded using the port of the ports that is not the determined port.

In one embodiment, a device includes memory and a processing unit. The memory is configurable to store address information of ports of a node, the ports including a first port associated with a ring of nodes, the node configurable as a node in the ring, address information of a particular port identifying a set of one or more addresses associated with the particular port. The processing unit is configurable to: in response to one of the ports receiving a first control message in response to a failure on the ring, cause address information of the first port to be cleared from the memory; and in response to one of the ports receiving a second control message in response to the failure, cause the address information of the first port to be maintained in the memory.

In certain embodiments, the processing unit may be further configurable to: in response to one of the ports receiving the first control message, cause a switch from a first state to a second state at the node, wherein causing the address information of the first port to be maintained in response to one of the ports receiving the second control message is based on the second state of the node. The first control message and the second control message may be received on different ports of the ports. In response to one of the ports receiving the first control message, address information of the first port is caused to be cleared from the memory, without clearing address information of a second port of the ports that is not the first port from the memory. The first control message and the second control message may be received according to an Ethernet ring protection switching protocol.

In one embodiment, a computer-readable memory storing instructions includes: instructions that cause a processing unit to access a control message received at a network device, the network device configurable as a network device in multiple network devices configured in a ring, the control message received in response to a failure on the ring, address information of a particular port identifying a set of one or more addresses associated with the particular port; instructions that cause the processing unit, in response to receipt of the control message, to cause address information of a first port of the network device to be cleared, without clearing address information of a second port of the network device; and instructions that cause the processing unit, in response to receipt of the control message, to cause the control message to be forwarded to a neighbor network device of the multiple network devices. A flag of the forwarded control message indicates to the neighbor network device which port to clear address information.

In certain embodiments, the memory may further include: instructions that cause the processing unit, in response to receipt of the control message, to cause a blocked port of the network device to be unblocked to allow data message traffic using the unblocked port; and instructions that cause the processing unit, in response to receipt of the control message, to cause the flag of the forwarded control message to be set, wherein the set flag of the forwarded control message indicates to the neighbor network device to clear address information of a port on which the forwarded control message is not received. The memory may further include instructions that cause the processing unit to determine a port of the network device on which the control message was received, wherein causing the control message to be forwarded to the neighbor network device further includes causing the control message to be forwarded using a port of the network device that is not the determined port.

In certain embodiments, the memory may further include: instructions that cause the processing unit to determine a port of the network device on which the control message was received; and instructions that cause the processing unit to determine whether a flag of the control message is set, wherein causing address information of the first port to be cleared further includes: if the flag of the control message is determined as not being set, causing address information of the determined port to be cleared, the first port being the determined port; and if the flag of the control message is determined as being set, causing address information of a port of the network device that is not the determined port to be cleared, the first port not being the determined port. The memory may further include: if the flag of the control message is determined as not being set, causing the control message to be forwarded to the neighbor network device by causing the control message with the flag not set to be forwarded using the port of the network device that is not the determined port; and if the flag of the control message is determined as being set, causing the control message to be forwarded to the neighbor network device by causing the control message with the flag set to be forwarded using the port of the network device that is not the determined port.

In one embodiment, a computer-readable memory storing instructions includes: instructions that cause a processing unit to access a first control message received at a network device, the network device configurable as a network device in multiple network devices configured in a ring, the first control message received in response to a failure on the ring, address information of a port identifying a set of one or more addresses associated with the port; instructions that cause the processing unit, in response to receipt of the first control message, to cause address information of a port of the network device to be cleared; instructions that cause the processing unit to access a second control message received at the network device, the second control message received in response to the failure; and instructions that cause the processing unit, in response to receipt of the second control message, to cause the address information of the port to be maintained.

In certain embodiments, the memory may further include: instructions that cause the processing unit, in response to receipt of the first control message, to cause a switch from a first state to a second state at the network device, wherein causing the address information of the port to be maintained in response to receipt of the second control message is based on the second state of the network device. The first control message and the second control message may be received on different ports of the network device. In response to receipt of the first control message, address information of the port of the network device is caused to be cleared, without clearing address information of another port of the network device. The first control message and the second control message may be received according to an Ethernet ring protection switching protocol.

In one embodiment, a method includes receiving, at a network device in multiple network devices configured in a ring, a first control message in response to a failure on the ring, address information of a port identifying a set of one or more addresses associated with the port;

in response to receiving the first control message, clearing address information of a port of the network device; receiving, at the network device, a second control message in response to the failure; and in response to receiving the second control message, maintaining the address information of the port.

In certain embodiments, the method may further include: in response to receiving the first control message, switching from a first state to a second state at the network device, wherein maintaining the address information of the port in response to receiving the second control message is based on the second state of the network device. The first control message and the second control message may be received on different ports of the network device. In response to receiving the first control message, address information of the port of the network device is cleared, without clearing address information of another port of the network device. The first control message and the second control message may be received according to an Ethernet ring protection switching protocol.

In one embodiment, a device including memory and a processing unit. The memory is configurable to store address information of three ports of a node, the three ports including a first port associated with a first ring of nodes, and a second port and a third port both associated with a second ring of nodes, the node configurable to interconnect the first ring and the second ring, address information of a particular port identifying a set of one or more addresses associated with the particular port. The processing unit is configurable, in response to the first port receiving a control message in response to a failure on the first ring, to cause address information of one of the three ports to be cleared from the memory, without clearing address information of the other two of the three ports from the memory.

In certain embodiments, the processing unit may be further configurable to determine on which of the three ports to cause address information to be cleared based on a flag of the control message received at the first port. The processing unit may be further configurable to determine whether the flag of the control message received at the first port is set, wherein causing address information of one of the three ports to be cleared further includes: if the flag of the control message is determined as not being set, causing address information of the first port to be cleared; and if the flag of the control message is determined as being set, causing address information of one of the second port and the third port to be cleared. The processing unit may be further configurable to determine on which of the second port and the third port to cause address information to be cleared based on labels associated with the ports. Labels associated with the first port and the port of the second port and the third port determined for clearing address information may be the same.

In one embodiment, a method includes receiving, at a first port of a network device in multiple network devices configured in interconnected rings including a first ring and a second ring, a control message in response to a failure on the first ring, the network device interconnecting the first ring and the second ring, address information of a particular port identifying a set of one or more addresses associated with the particular port; and in response to receiving the control message, clearing address information of one of three ports of the network device, without clearing address information of the other two of the three ports, the three ports including the first port associated with the first ring, and a second port and a third port both associated with the second ring.

In certain embodiments, the method may further include determining on which of the three ports to clear address information based on a flag of the control message. The method may further include: determining whether the flag of the control message is set, wherein clearing address information of one of the three ports further includes: if the flag of the control message is determined as not being set, clearing address information of the first port; and if the flag of the control message is determined as being set, clearing address information of one of the second port and the third port. The method may further include determining on which of the second port and the third port to clear address information based on labels associated with the ports. Labels associated with the first port and the port of the second port and the third port determined for clearing address information may be the same.

In one embodiment, a computer-readable memory storing instructions includes: instructions that cause a processing unit to access a control message received at a first port of a network device, the network device configurable to interconnect a first ring of network devices and a second ring of network devices, the control message received in response to a failure on the first ring, address information of a particular port identifying a set of one or more addresses associated with the particular port; and instructions that cause the processing unit, in response to receipt of the control message, to clear address information of one of three ports of the network device, without clearing address information of the other two of the three ports, the three ports including the first port associated with the first ring, and a second port and a third port both associated with the second ring.

In certain embodiments, the memory may further include instructions that cause the processing unit to determine on which of the three ports to clear address information based on a flag of the control message. The memory may further include: instructions that cause the processing unit to determine whether the flag of the control message is set, wherein clearing address information of one of the three ports further includes: if the flag of the control message is determined as not being set, clearing address information of the first port; and if the flag of the control message is determined as being set, clearing address information of one of the second port and the third port. The memory may further include instructions that cause the processing unit to determine on which of the second port and the third port to clear address information based on labels associated with the ports. Labels associated with the first port and the port of the second port and the third port determined for clearing address information may be the same.

Figure 1:
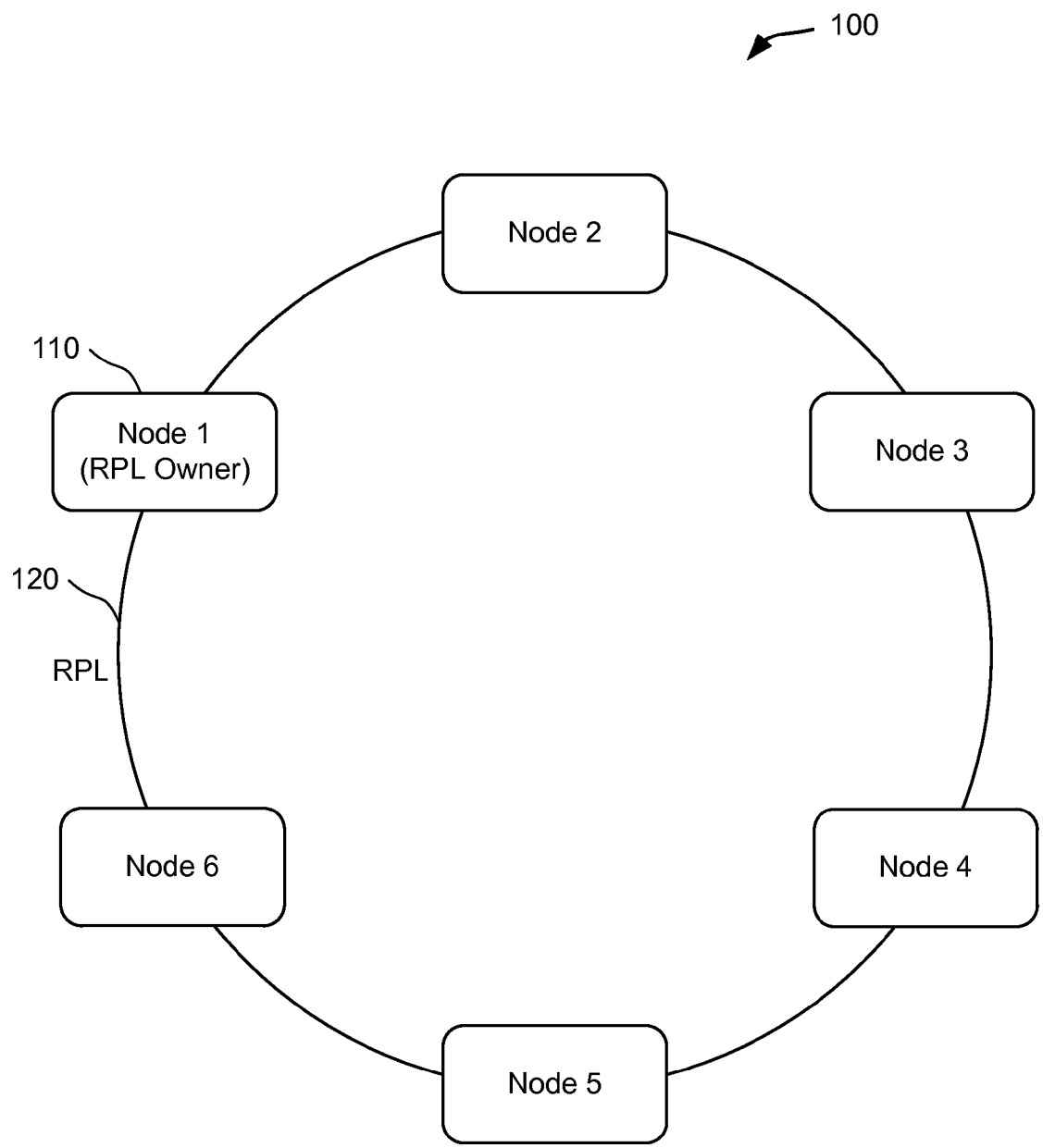
FIG. 1 depicts a simplified diagram of an Ethernet Ring Protection (ERP) ring with a Ring Protection Link (RPL) Owner and RPL port in blocked state.

The foregoing, together with other features and embodiments, will become more apparent when referring to the following specification, claims, and accompanying drawings.

DETAILED DESCRIPTION

In the following description, for the purposes of explanation, specific details are set forth in order to provide a thorough understanding of certain embodiments of the invention. However, it will be apparent that various embodiments may be practiced without these specific details. The figures and description are not intended to be restrictive.

Embodiments of the present invention relate to networking and more particularly to techniques for ring protection switching. In one embodiment, flushing of network device addresses is performed only once on receiving a first control message. For example, when a first R-APS(SF) message is received, a network device may switch from an Idle state to a Protection state, which may indicate that the MAC addresses are not to be flushed if additional R-APS(SF) messages are received. In another embodiment, flushing of network device addresses is performed on one of the ring ports rather than on both ring ports. For example, the port on which a MAC address flush is to be performed can be determined using a flag field, such as the flag field of the R-APS(SF) PDU. In another embodiment, flushing of network device addresses is performed on one of the ring ports rather than on all three ring ports of an interconnection node. For example, the ring port on which a MAC address flush is to be performed can be determined using a flag field, such as the flag field of the R-APS(SF) PDU, and possibly labels associated with the three ring ports. Although examples and embodiments described below reference the G.8032 ERPS protocol, the techniques described herein may apply to other ring protection protocols. Similarly, the techniques described herein may apply to flushing of addresses other than MAC addresses.

Introduction

The G.8032 ERP standard defines the automatic protection switching protocol and protection switching mechanisms for Ethernet Ring topologies. One of the nodes (i.e., network devices) in the ring acts as an owner or manager of a Ring Protection Link (RPL). The RPL Owner keeps a ring port to the RPL (i.e., the RPL port) in a blocking state for data message traffic. However, the RPL is kept in an open state for control message traffic. The RPL port blocking avoids the loop in the ring. When there is a topology change, e.g., due to a failure on the ring such as a signal failure on one of the ports or a node failure, the RPL Owner unblocks the RPL port to allow data message traffic to be restored. Although examples and embodiments described below generally refer to signal failures, the techniques described herein may apply to other types of topology changes (e.g., node failures, adding a node to the ring, or removing a node from the ring, manual or forced switch in the ring, etc.).

ERP exchanges PDUs called R-APS PDUs for protocol operation. When any node in the ring detects a topology change, the node initiates protection switching by blocking its ring port facing the failed link and generating a R-APS (SF) PDU. These PDUs are transmitted on a control channel (i.e., a R-APS channel) and processed by the other nodes in the ring. On receiving the PDU, each node will flush (e.g., remove, clear, or un-learn) the MAC addresses learned on both of its ring ports. The RPL Owner unblocks its RPL port to restore the data message traffic on a data channel in the ring. In some embodiments, the non-RPL Owner node on the other end of the RPL (e.g., an RPL Neighbor) also unblocks its RPL port to restore the data message traffic. Each node re-learns MAC addresses on its flushed ring ports, e.g., by broadcasting data frames through the network until learning of the corresponding MAC addresses is completed.

In the examples and embodiments described below, it is presumed that logical rings in the network topology have already been identified and configured. The identifying and configuring may have been performed manually (i.e., by a human) or automatically. Examples of techniques for identifying and configuring logical rings in a network topology automatically using a Multiple Ring Identification and Configuration Protocol (MRICP) are described in U.S. patent application Ser. Nos. 13/954,861 and 13/954,867, which were filed on Jul. 30, 2013, each of which is herein incorporated by reference in its entirety for all purposes. As provided in these applications, the techniques can include two separate sequentially performed phases. In the first phase, the protocol can automatically identify all rings that are present within a Virtual Local Area Network (VLAN) topology. In the second phase, the protocol can automatically load each ring node with appropriate configuration in conformity with the ERP protocol. After this ERP configuration of each node has been performed, the failure of a link within the network will not require every network node to re-learn paths through the network; instead, the nodes that are required to re-learn such paths can be limited to those within the particular ring that contained the failed link.

FIG. 1 depicts a simplified diagram of an ERP ring 100 with an RPL Owner 110 and an RPL 120 in blocked state. In this example, Node 1 acts as the RPL Owner 110 with the link connecting to Node 6 as the RPL 120. The RPL Owner 110 keeps the RLP port to the RPL 120 in blocked state to break the loop when the topology is in a stable state.

Figure 2:
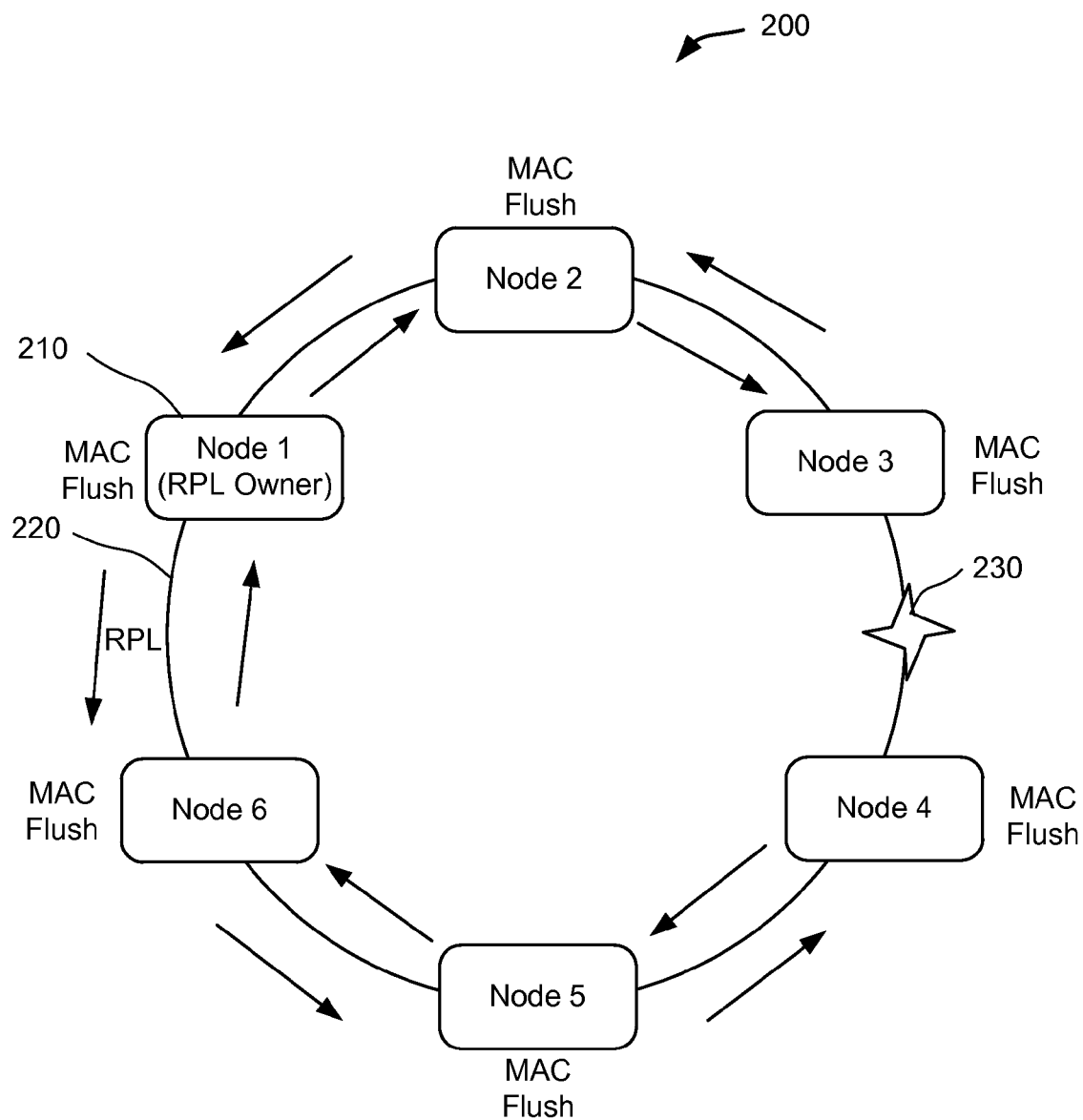
FIG. 2 depicts a simplified diagram of an ERP ring with a signal failure on the link connecting Node 3 and Node 4.

FIG. 2 depicts a simplified diagram of an ERP ring 200 with a signal failure 230 on the link connecting Node 3 and Node 4. Node 1 acts as the RPL Owner 210 with the link connecting to Node 6 as the RPL 220. On detection of this signal failure 230, the following actions are taken according to the G.8032 ERP standard:

1. Each node on both sides of the signal failure 230, Node 3 and Node 4 in this example, will perform MAC address flush on both of its ring ports and transmit R-APS(SF) to its neighbor nodes to indicate the signal failure or topology change. The arrows around the outside of the ERP ring 200 indicate the transmitting and forwarding of the R-APS(SF) generated by Node 3 in a counter-clockwise direction around the ERP ring 200. The arrows around the inside of the ERP ring 200 indicate the transmitting and forwarding of the R-APS(SF) generated by Node 4 in a clockwise direction around the ERP ring 200.

2. Each of the other nodes in the ring, Nodes 1-2 and 5-6 in this example, on receiving the R-APS(SF) on one ring port, performs MAC address flush on both of its ring ports. The node then forwards the R-APS(SF) using its other ring port (i.e., the non-receiving ring port) to its neighbor node. As illustrated in FIG. 2, the R-APS(SF), as control message traffic, crosses the RPL Owner 210 and the RPL 220, as the R-APS(SF) traverses the ring. Since the R-APS(SF) is received on both ring ports of a node, from Node 3 in one direction around the ring and from Node 4 in the other direction around the ring, MAC address flush is performed twice on each of the node's two ring ports.

3. The RPL owner 210, Node 1 in this example, in addition to performing the MAC address flushes, unblocks the RPL port to allow data message traffic to use the RPL 220. The RPL port is open to control message traffic (e.g., R-APS(SF) messages) even when it is blocked to data message traffic.

MAC Address Flush Optimizations on Ethernet Rings

This section describes techniques for optimizing MAC address flushes on Ethernet rings for faster traffic restoration. Some embodiments described below do not implement or do not use flush logic of the current G.8032 ERP standard that tracks (node ID, blocked port reference (BPR)) pairs extracted from R-APS messages to make MAC address flush decisions.

Figure 3:
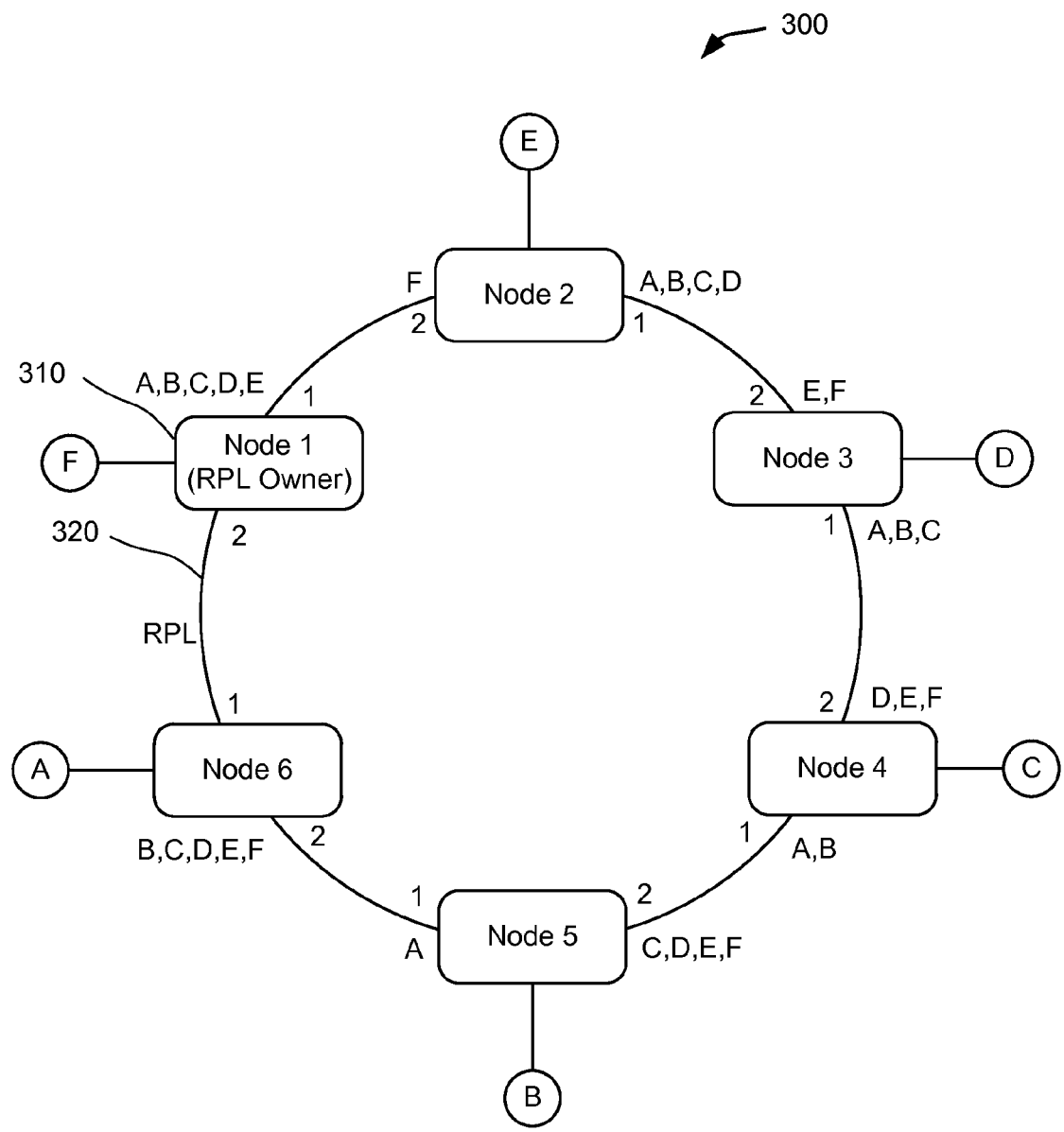
FIG. 3 depicts a simplified diagram of an ERP ring with MAC address learning before a signal failure.

FIG. 3 depicts a simplified diagram of an ERP ring 300 with MAC address learning before a signal failure. Node acts as the RPL Owner 310 with the link connecting to Node 6 as the RPL 320. In FIG. 3, six MAC address stations (i.e., A, B, C, D, E, F) are exchanging traffic with each other. The current MAC address learning on each of these nodes is as depicted in FIG. 3. Each node of the ERP ring 300 has two ring ports, indicated in FIG. 3 by the port numbers 1 and 2. Each ring port has an associated label, such as the port number (e.g., 0 or 1; 1 or 2) or a "left" or "right" label, although other labels are also possible. The label itself is arbitrary, but association of labels to ring ports of ERP ring nodes needs to be consistent.

In the embodiment depicted in FIG. 3, the ring ports of a node are numbered in a counter-clockwise direction around the ERP ring 300. That is, traveling counter-clockwise around the ERP ring 300, port number 1 of a node is reached before port number 2 of the node. In other embodiments, ring ports are numbered in a different manner, e.g., in a clockwise direction.

Assuming the link connecting Node 3 and Node 4 experiences a signal failure, not all the ring ports on which MAC addresses are learned need to be flushed. Only one ring port on each node would be flushed as follows:

1. On Node 2, only the ring port on which the MAC addresses are learned for stations A, B, C, and D would be flushed, and the other ring port would not be flushed. That is, port number 1 would be flushed, while port number 2 would not be flushed. This is because the MAC address station F learned on port number 2 is still valid for Node 2, such that routing from Node 2 to station F is unaffected by the signal failure between Node 3 and Node 4. However, MAC address stations A, B, and C learned on port number 1 is no longer valid for Node 2, because routing from Node 2 to those MAC address stations was affected by the signal failure.

2. On Node 3 and Node 4, MAC address flush is performed on the ring port to the link that has the signal failure. That is, port number 1 of Node 3 and port number 2 of Node 4 would be flushed. The other ring ports of Node 3 and Node 4 would not be flushed.

3. On Node 5, only the ring port on which the MAC addresses are learned for stations C, D, E, and F would be flushed. The ring port on which the MAC address is learned for station A would not be flushed. That is, port number 2 would be flushed, while port number 1 would not be flushed.

4. On Node 6, only the ring port on which the MAC addresses are learned for stations B, C, D, E, and F would be flushed. That is, port number 2 would be flushed, while port number 1 would not be flushed. There is no current MAC address learning on port number 1 of Node 6, because data message traffic is blocked on the RPL 320 when the topology is in a stable state.

Effectively, only one ring port of each node of the ERP ring 300 needs to be flushed, and the data message traffic would still be restored. There is a pattern to the ring ports which need to be flushed. The ring port of a node that needs to be flushed is the ring port that, when the topology is in a stable state, would receive data message traffic traveling from the point of the signal failure. From the point of the signal failure to the RPL Owner 310, there are 2 paths.

Path 1: Node 3→Node 2→Node 1 (RPL Owner 310). For all these nodes, only port number 1 is flushed.

Path 2: Node 4→Node 5→Node 6→Node 1 (RPL Owner 310). For Node 4, Node 5, and Node 6, only port number 2 is flushed.

MAC Address Flushing Only Once at a Node in Response to a Failure

In the example of FIG. 3, both Node 3 and Node 4 will continue generating R-APS(SF) PDUs as long as the signal failure between them persists. For example, R-APS(SF) PDUs may be generated by a node every five seconds while a failure condition persists on a ring. Under the present G.8032 ERPS protocol, any node receiving a R-APS(SF) will perform a MAC address flush on both of its ring ports. This flushing of both ring ports instead of just the ring port affected by the failure is one inefficiency of the current G.8032 ERPS protocol. As each node in the ERP ring 300 will receive a R-APS(SF) PDU from each of Node 3 and Node 4, each node will perform the MAC address flush twice. This double flushing at the node is another inefficiency of the current G.8032 ERPS protocol.

It would be more efficient to perform MAC flush only once and only on one ring port of a node for a failure on the ring. In one embodiment, a node flushes MAC addresses only once in response to a failure on the ring. This can be achieved, for example, by using the ERP node state transition from Idle state to Protection state. When there is no failure on the ring (e.g., a signal failure), each node of the ring will be in Idle state. When there is a signal failure on the ring, each node of the ring will change to Protection state upon receiving a first R-APS(SF) PDU. The first R-APS(SF) PDU will result in this node state transition along with the MAC address flush, and subsequent R-APS(SF) PDUs for the same signal failure will not result in any MAC address flush. A subsequent R-APS(SF) PDU may be received from the same node that generated the first R-APS(SF) PDU or from the other node adjacent to the affected link. For the example of FIG. 3, irrespective of whether the first R-APS (SF) PDU is received from Node 3 or Node 4, the MAC address flush will happen only once when the node changes from Idle state to Protection state.

MAC Address Flushing Only Once at a Node at the Receiving Ring Port

Under the present G.8032 ERPS protocol, when a node performs MAC address flush in response to receiving a R-APS(SF), both of the node's ring ports are flushed. However, only one of the node's ring ports (i.e., the affected ring port) needs to be flushed because MAC addresses learned on that ring port become invalid for the node due to the failure. In contrast, MAC addresses learned on the other ring port (i.e., the unaffected ring port) of the node are still valid following the failure. Thus, the valid MAC addresses are unnecessarily flushed, along with the necessary flushing of the invalid MAC addresses, and the valid MAC addresses need to be relearned.

In one embodiment, a node flushes MAC addresses learned on only one of its ring ports in response to a failure on the ring. The ring port on which to perform the MAC address flush needs to be determined. As discussed above, MAC address flushing at a node need only occur on one of the two ring ports, i.e., either port number 1 or port number 2 in the example of FIG. 3. In some scenarios, the ring port on which to perform the MAC address flush should be determined as the receiving ring port, i.e., the ring port that receives the respective R-APS(SF) indicating the failure on the ring.

Referring to the example of FIG. 3, for the R-APS(SF) PDUs generated by Node 3:

On Node 2, reception at port number 1 of the R-APS(SF) generated by Node 3 should result in MAC address flushing on port number 1 but not on port number 2. That is, the ring port of Node 2 that is flushed is the receiving ring port, i.e., the ring port that receives the R-APS(SF) generated by Node 3.

On Node 1, reception at port number 1 of the R-APS(SF), generated by Node 3 and forwarded by Node 2, should result in MAC address flushing on port number 1 but not on port number 2. That is, the ring port of Node 1(the RPL Owner 310) that is flushed is the non-RPL ring port (i.e., the ring port that is not facing the RPL 320), which is also the receiving ring port here.

For R-APS(SF) PDUs generated by Node 4:

On Node 5, reception at port number 2 of the R-APS(SF) generated by Node 4 should result in MAC address flushing on port number 2 but not on port number 1. That is, the ring port of Node 5 that is flushed is the receiving ring port, i.e., the ring port that receives the R-APS(SF) generated by Node 4.

On Node 6, reception at port number 2 of the R-APS(SF), generated by Node 4 and forwarded by Node 5, should result in MAC address flushing on port number 2 but not on port number 1. That is, the ring port of Node 6 that is flushed is the receiving ring port.

MAC Address Flushing Only Once at a Node at the Non-Receiving Ring Port

A scenario may occur where the R-APS(SF) generated by Node 3 is received at Node 6 before the R-APS(SF) generated by Node-4 is received at Node 6. In such a case, flushing the Node 6 ring port at which the earlier R-APS(SF) is received (i.e., the receiving ring port for the earlier R-APS(SF)) would result in MAC address flush being performed on the unaffected ring port (here, port number 1). Instead, the ring port on which to perform the MAC address flush should be determined as the non-receiving ring port, i.e., the ring port that does not receive the earlier R-APS(SF) indicating the failure on the ring. Using the following technique results in MAC address flushing only on the affected ring port and not on the unaffected ring port. A ring port is affected by the failure if at least one MAC address learned on it is no longer valid due to the failure. A ring port is unaffected by the failure if all the MAC addresses learned on it are still valid following the failure.

When the R-APS(SF) crosses the RPL Owner 310 (here, Node 1), a flag field of the PDU header may be set (e.g., set to 1). This flag field is not used by ERP and is ignored on reception under the current G.8032 ERPS protocol. Thus, using this flag field will not have inter-operability issues with equipment implementing the current G.8032 ERPS protocol.

In the case of FIG. 3, when the R-APS(SF) from Node 3 is received at the RPL Owner 310 (Node 1), the flag is set to 1, and the R-APS(SF) with the set flag is forwarded to Node 6. The RPL Owner 310 (Node 1) performs a MAC address flush on the non-RPL ring port, which is the receiving ring port here. When the R-APS(SF), generated by Node 3 and forwarded by the RPL Owner 310 (Node 1), is received at Node 6, the flag field is checked. Because the flag was set by the RPL Owner 310, Node 6 determines that the flag is set and performs MAC address flush on port number 2 (i.e., the non-receiving ring port for this earlier R-APS (SF)) rather than on port number 1 (i.e., the receiving ring port).

Similarly, if a R-APS(SF) from Node 4 reaches the RPL Owner 310 (Node 1), the flag is set (e.g., set to 1), and the R-APS(SF) with the set flag is forwarded to Node 2. The RPL Owner 310 (Node 1) performs a MAC address flush on the non-RPL ring port, which is the non-receiving ring port here. The RPL Owner 310 forwards the R-APS(SF) with the set flag on its non-RPL ring port to Node 2 using a multicast destination MAC address of the R-APS(SF) PDU. When the R-APS(SF), generated by Node 4 and forwarded by the RPL Owner 310 (Node 1), is received at Node 2, the flag field is checked. Because the flag was set by the RPL Owner 310, Node 2 determines that the flag is set and performs MAC address flush on port number 1 (i.e., the non-receiving ring port for this earlier R-APS(SF)) rather than on port number 2 (i.e., the receiving ring port).

The above technique utilizing the presently unused flag field of the R-APS(SF) PDU header limits MAC address flushing to only one ring port, the affected ring port, of a node, irrespective of which node of the ring generated the R-APS(SF), Node 3 or Node 4 in this example. In other embodiments, a different indicator (e.g., a different field of the PDU header) can be used to indicate that MAC address flushing is to be performed on the non-receiving ring port.

Combining the techniques explained above results in flushing the MAC addresses only once and only on one ring port of each node in the ring, providing a significant reduction in the time taken to restore traffic due to the reduction in inefficient, redundant flushing when compared to flushing under the current G.8032 ERPS protocol. However, some embodiments may implement fewer than all of the above techniques, which would still lead to improved efficiency. For example, in one embodiment, having a node flush MAC addresses only once in response to a particular failure on the ring (i.e., flushing upon receipt of a first, but not a subsequent, R-APS(SF) for the failure) avoids inefficient, redundant flushing, since the MAC addresses that are no longer valid due to the failure have already been flushed upon receipt of the first R-APS(SF). In another embodiment, having a node flush MAC addresses only on the affected ring port (i.e., flushing on the non-receiving ring port if the flag is set, otherwise on the receiving ring port) avoids inefficient, redundant flushing, since all the MAC addresses learned on the unaffected ring port are still valid following the failure.

Filtering Database (FDB) Flush on Major Ring When Sub-Ring Experiences a Signal Failure (SF)

Figure 4:
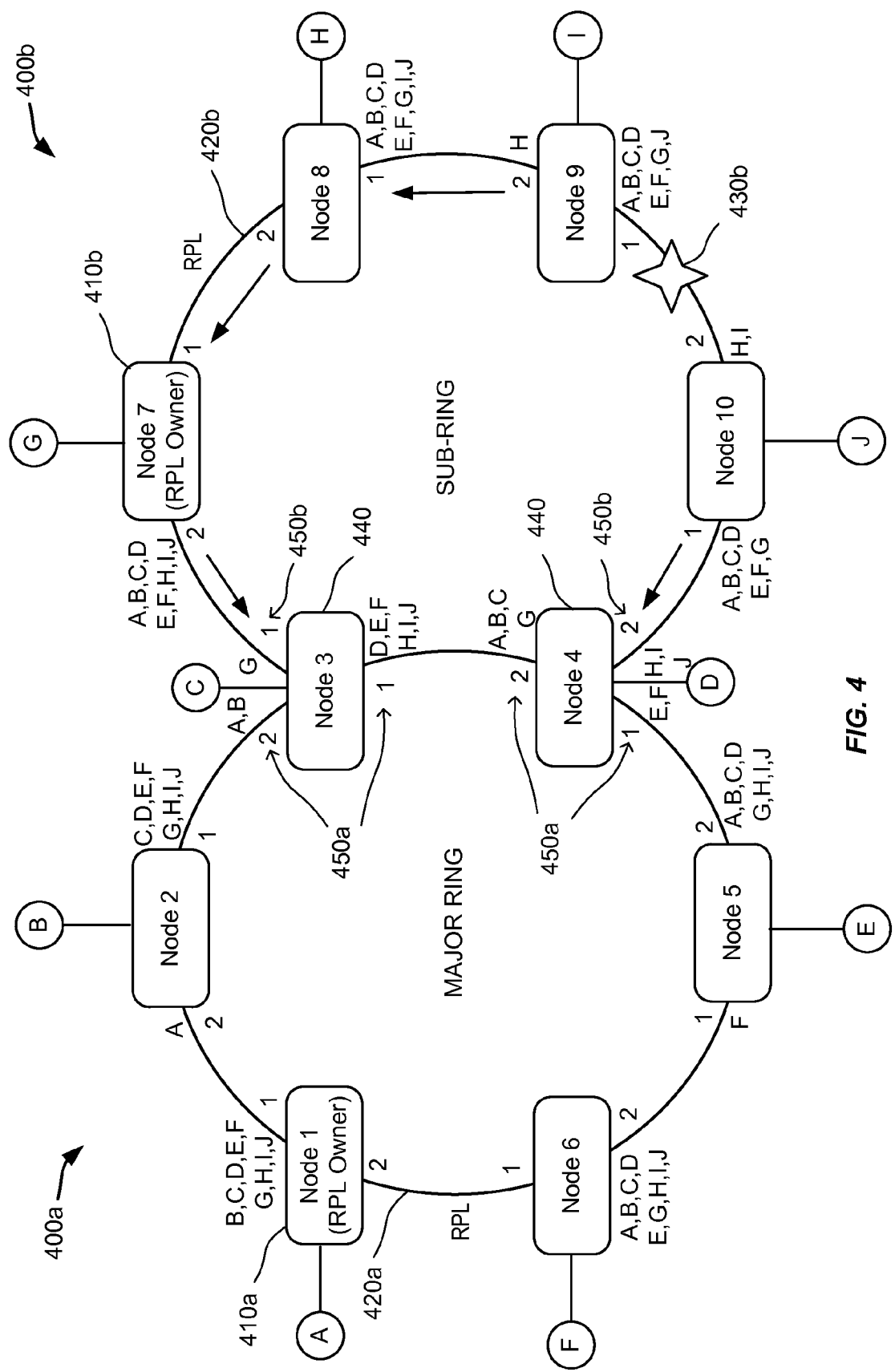
FIG. 4 depicts a simplified diagram of two ERP rings: a major ring and a sub-ring.

An FDB flush consists of removing MAC addresses learned on the ring ports of the protected Ethernet ring from the node's FDB. FIG. 4 depicts a simplified diagram of two ERP rings: a major ring 400a and a sub-ring 400b. Interconnection nodes 440 (i.e., Node 3 and Node 4 in this example) are nodes which connect the major ring 400a and the sub-ring 400b. In the example of FIG. 4, the interconnection nodes 440 are interconnected by a single link with no intervening nodes. Each interconnection node 440 has three ring ports: two major ring ports 450a (i.e., ring ports associated with the major ring 400a), and one sub-ring port 450b (i.e., a ring port associated with the sub-ring 400b). Each interconnection node 440 is associated with two ERP instances: one for the major ring 400a, and the other for the sub-ring 400b. Each ERP instance configures its own RPL and RPL Owner node, and activates protection switching procedures independently of each other ERP instance. The major ring ERP instance (i.e., the ERP instance for the major ring 400a) flushes the major ring ports 450a, while the sub-ring ERP instance (i.e., the ERP instance for the sub-ring 400b) flushes the sub-ring port 450b. The ERP mechanism flushes the FDB with the goal of re-learning the correct filtering entries when protection switching has executed.

The major ring 400a forms a complete ring, whereas the sub-ring 400b forms a broken ring, because the link connecting the interconnection nodes 440 is owned (e.g., controlled and protected) by the major ring 400a only, and not by the sub-ring 400b. The major ring 400a has an RPL Owner 410a (here, Node 1) responsible for blocking and unblocking data message traffic over the RPL 420a. In some embodiments, the non-RPL Owner node on the other end of the
RPL 420a (e.g., an RPL Neighbor—here, Node 6) also blocks and unblocks its RPL port to data message traffic. Similarly, the sub-ring 400b has an RPL Owner 410b (here, Node 7) responsible for blocking and unblocking data message traffic over the RPL 420b, and can have an RPL Neighbor (here, Node 8) that also blocks and unblocks its RPL port to data message traffic.

In the example of FIG. 4, the link connecting Node 9 and Node 10 experiences a signal failure 430b. Each of Node 9 and Node 10 starts transmitting R-APS(SF) PDUs. The arrows in the counter-clockwise direction around the sub-ring 400b indicate transmitting and forwarding of the R-APS (SF) generated by Node 9. The arrow in the clockwise direction of the sub-ring 400b indicates transmitting of the R-APS(SF) generated by Node 10. In some embodiments, in the case of a sub-ring signal failure 430b, the R-APS(SF) terminates on the interconnection nodes 440, here Node 3 and Node 4. That is, each interconnection node 440 does not forward the R-APS(SF) for a sub-ring signal failure 430b to any other node, including the other interconnection node 440, of the major ring 400a. This may occur, for example, when the sub-ring 400b is operated without a R-APS virtual channel between the interconnection nodes 440. In some embodiments (e.g., if so configured), each interconnection node 440 generates and transmits a R-APS Flush Event (R-APS(FE)) message to other nodes, including the other interconnection node 440, of the major ring 400a. The R-APS(FE) can trigger FDB flush on the ring ports of the major ring 400a nodes.

On receiving the R-APS(SF) for the sub-ring signal failure 430b, nodes that are part of the sub-ring 400b perform an FDB flush on both ring ports under the current G.8032 ERPS protocol. Similarly, on receiving the R-APS (FE) for the sub-ring signal failure 430b, non-interconnection nodes that are part of the major ring 400a perform an FDB flush on both ring ports under the current G.8032 ERPS protocol. When an interconnection node 440 receives the R-APS(SF) for the sub-ring signal failure 430b, the sub-ring ERP instance performs an FDB flush on the sub-ring port 450b. The sub-ring port 450b is also the receiving ring port, because the other ring ports of the interconnection node 440 (i.e., the major ring ports 450a) would not receive a R-APS (SF) for the sub-ring signal failure 430b. On the interconnection nodes 440, the sub-ring ERP instance also signals the major ring ERP instance to perform the FDB flush. For the current G.8032 ERPS protocol, both of the major ring ports 450a of each interconnection node 440 are flushed to restore the data message traffic. However, only one of the two major ring ports 450a of each interconnection node 440 is affected by the sub-ring signal failure 430b. The flushing of all three ring ports of an interconnection node 440 is another inefficiency of the current G.8032 ERPS protocol. In addition, the flushing of both ring ports of nodes of the sub-ring 400b and non-interconnection nodes of the major ring 400a is also inefficient under the current G.8032 ERPS protocol.

In some embodiments, only one of the two ring ports of nodes of the sub-ring 400b will be flushed in response to a sub-ring signal failure 430b. On receiving the R-APS(SF) for the sub-ring signal failure 430b, non-RPL Owner nodes that are part of the sub-ring 400b will perform an FDB flush only on the receiving ring port. The RPL Owner 410b (here, Node 7) will perform an FDB flush only on the non-RPL ring port. This provides a reduction in the time taken to restore traffic due to the avoidance of unnecessary flushing at a ring port of the sub-ring nodes when compared to flushing under the current G.8032 ERPS protocol, which requires flushing on both ring ports of the sub-ring nodes.

Filtering Database (FDB) Flush on Only One Ring Port of an Interconnection Node When Sub-Ring Experiences a Signal Failure (SF)

In some embodiments, only one of the three ring ports of an interconnection node 440 will be flushed in response to a sub-ring signal failure 430b. The ring port of the interconnection node 440 chosen for the flush depends on a flag field of the R-APS(SF) PDU header and possibly depends on the label associated with the sub-ring port 450b. In still other embodiments, a different indicator (e.g., a different field of the PDU header) can be used to determine which ring port of the interconnection node 440 is to be flushed.

Examples of flushing at an interconnection node 440 on a single ring port are now provided with reference to FIG. 4, which also depicts entries of the FDB at the ring ports before the sub-ring signal failure 430b occurs. In the example of FIG. 4, ten stations (i.e., A, B, C, D, E, F, G, H, I, J), such as MAC address stations, are exchanging traffic with each other. When the sub-ring signal failure 430b occurs between Node 9 and Node 10, the RPL Owner 410b (Node 7 in FIG. 4) receives the R-APS(SF) and will perform an FDB flush on the non-RPL ring port, which is the non-receiving ring port here. The RPL Owner 410b also sets a flag field of the R-APS(SF) PDU header and forwards the R-APS(SF) with the set flag, using the non-receiving ring port, to the neighbor node.

When an interconnection node 440 receives a R-APS(SF) for the sub-ring signal failure 430b, the sub-ring ERP instance checks the flag field. If the R-APS(SF) was not forwarded to the interconnection node 440 through the RPL Owner 410b, the flag will not be set, and the sub-ring ERP instance of the interconnection node 440 performs an FDB flush on the sub-ring port 450b, which is also the receiving ring port. However, in this embodiment with the flag not set, the sub-ring ERP instance will not signal the major ring ERP instance to perform an FDB flush on either of its two major ring ports 450a, as there is no need to flush the major ring ports 450a. Thus, when the interconnection node 440 receives the R-APS(SF) with the flag not set, FDB flush is only performed on the sub-ring port 450b.

An example of this process is provided for interconnection Node 4. For Node 4, before the sub-ring signal failure 430b occurs, the FDB at sub-ring port 450b labeled as port number 2 has entries for stations H, I, and J, and the major ring port 450a labeled as port number 2 has entries for stations A, B, C, and G. When the sub-ring signal failure 430b occurs between Node 9 and Node 10, the FDB entries for stations H and I are no longer valid at sub-ring port 450b of Node 4. When the sub-ring ERP instance of Node 4 receives the R-APS(SF) and determines that the flag is not set (i.e., as the R-APS(SF) generated by Node 10 is not forwarded through the RPL Owner 410b to Node 4 ), the sub-ring ERP instance performs an FDB flush on the sub-ring port 450b. Because the FDB entries for stations H and I are no longer valid at sub-ring port 450b, an FDB flush is needed there. Following the sub-ring signal failure 430b, routing between Node 4 and stations H and I will occur through the major ring port 450a labeled as port number 2. However, because the FDB entries for stations A, B, C, and G at the major ring port 450a labeled as port number 2 are all still valid, an FDB flush does not need to be performed there. The FDB entries for stations A, B, C, and G will be maintained at the major ring port 450a labeled as port number 2. Instead, the major ring port 450a labeled as port number 2 can add FDB entries for stations H and I for the updated routing, for example, by broadcasting data frames through the network until the corresponding MAC addresses are re-learned. Thus, for interconnection Node 4, only performing an FDB flush on the sub-ring port 450b, but not on either of the major ring ports 450a, provides another improvement in efficiency compared to the flushing under the current G.8032 ERPS protocol.

Returning to the sub-ring ERP instance of an interconnection node 440 checking the flag field of the R-APS(SF) PDU header, if the sub-ring ERP instance determines that the flag is set (e.g., set to 1 because the R-APS(SF) was forwarded to the interconnection node 440 through the RPL Owner 410b), the sub-ring ERP instance does not perform an FDB flush on the sub-ring port 450b, which is also the receiving ring port. Under the single ERP ring scenario described above with reference to FIG. 3, a set flag indicates that the node should perform a flush at the non-receiving ring port. However, the interconnection node 440 does not have a non-receiving sub-ring port. Instead, the sub-ring ERP instance of the interconnection node 440 signals the major ring ERP instance to perform an FDB flush on only one of its two major ring ports 450a. The sub-ring ERP instance determines that the major ring port 450a for performing an FDB flush is the major ring port 450a with an associated label that is the same as the label associated with the sub-ring port 450b. Thus, when the interconnection node 440 receives the R-APS(SF) with the flag set, FDB flush is only performed on the major ring port 450a with the same associated label as that of the sub-ring port 450b.

An example of this process is provided for interconnection Node 3. For Node 3, before the sub-ring signal failure 430b occurs, the FDB at sub-ring port 450b labeled as port number 1 has a single entry for station G, and the major ring port 450a labeled as port number 1 has entries for stations D, E, F, H, I, and J. When the sub-ring signal failure 430b occurs between Node 9 and Node 10, the FDB entries for stations H and I are no longer valid at Node 3's major ring port 450a labeled as port number 1. When the sub-ring ERP instance of Node 3 receives the R-APS(SF) and determines that the flag is set (i.e., set by RPL Owner 410b before the R-APS(SF) is forwarded to Node 3 ), the sub-ring ERP instance does not perform an FDB flush on the sub-ring port 450b. Because the FDB entry for station G at the sub-ring port 450b is still valid following the sub-ring signal failure 430b, an FDB flush does not need to be performed there. The FDB entry for station G will be maintained at the sub-ring port 450b. Instead, with the flag set, the sub-ring ERP instance of interconnection Node 3 signals the major ring ERP instance to perform an FDB flush on the major ring port 450a with an associated label that is the same as the label associated with the sub-ring port 450b, here labeled as port number 1. The FDB flush at the major ring port 450a labeled as port number 1 removes the FDB entries for stations H and I, which are no longer valid. The sub-ring port 450b of Node 3 can add FDB entries for stations H and I for the updated routing, for example, by broadcasting data frames through the network until the corresponding MAC addresses are re-learned. Thus, for interconnection Node 3, only performing an FDB flush on the major ring port 450a labeled as port number 1, but not on the other major ring port 450a or the sub-ring port 450b, provides another improvement in efficiency compared to the flushing under the current G.8032 ERPS protocol. The other major ring port 450a, labeled as port number 2 for Node 3, remains unaffected by the sub-ring signal failure 430b.

The techniques explained above results in flushing the FDB on only one of the three ring ports (i.e., a major ring port or a sub-ring port) of an interconnection node when a failure on the sub-ring occurs. This provides a significant reduction in the time taken to restore traffic due to the reduction in unnecessary flushing at two ring ports of an interconnection node when compared to flushing under the current G.8032 ERPS protocol, which requires flushing on all three ring ports of the interconnection node.

Figure 5:
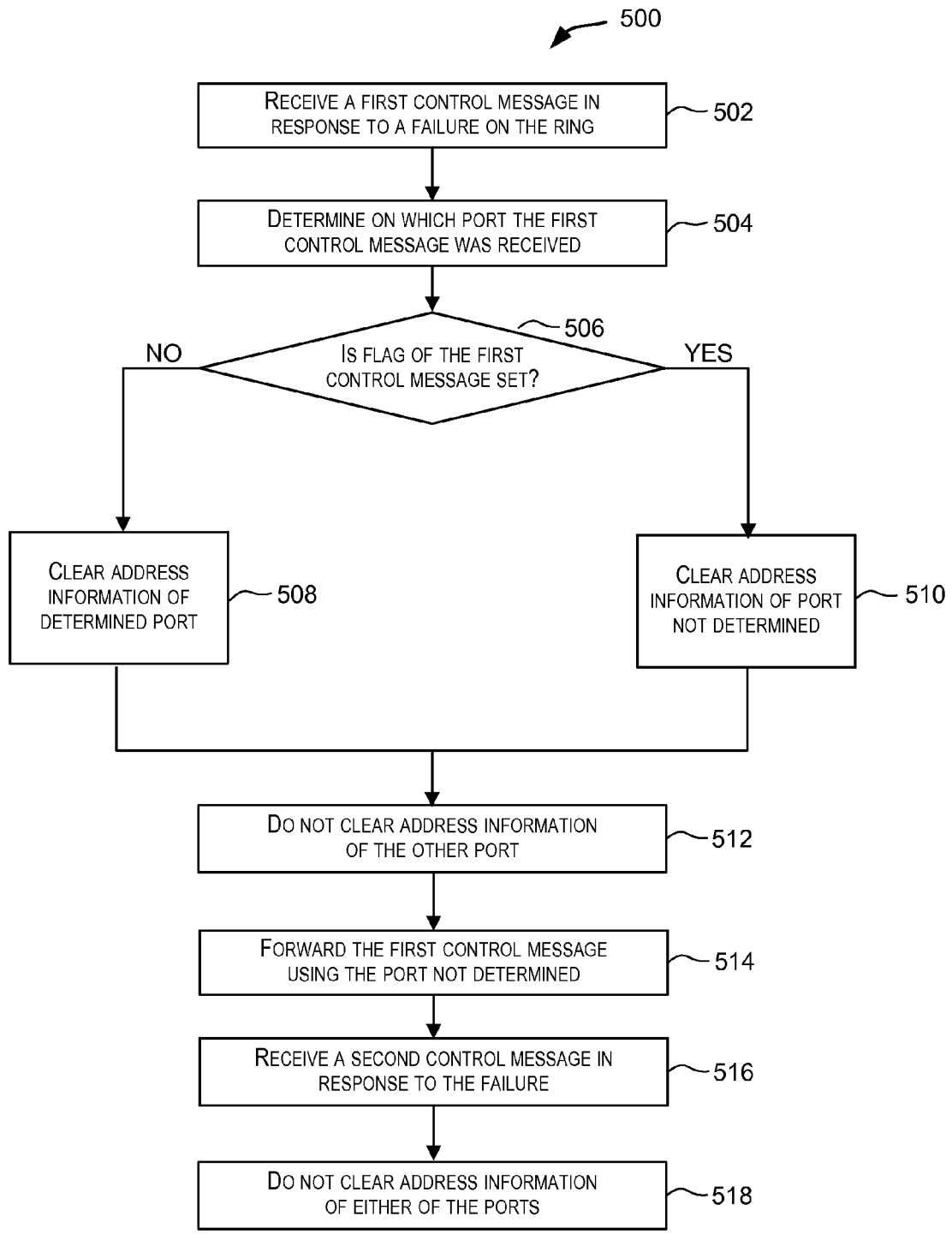
FIG. 5 depicts a simplified flowchart depicting clearing of address information at a non-RPL Owner network device in response to a failure on the ring.

FIG. 5 depicts a simplified flowchart 500 depicting clearing of address information at a non-RPL Owner network device in response to a failure on the ring according to an embodiment of the present invention. FIG. 5 will be described with reference to the example of FIG. 3. In the exemplary embodiment depicted in FIG. 5, the processing steps are performed by a network device of a plurality of network devices configured in a ring. The network device includes multiple ports configurable to receive control messages in response to a failure on the ring and a memory configurable to store address information of the ports. Address information of a particular port may identify a set of one or more addresses associated with the particular port. The processing depicted in FIG. 5 may be implemented in software (e.g., code, instructions, program) executed by one or more processing units (e.g., processors, cores), hardware, or combinations thereof. In certain embodiments, the software may be stored on a non-transitory computer-readable storage device or medium. The particular series of processing steps depicted in FIG. 5 is not intended to be limiting.

At 502, a first control message is received in response to a failure on a ring. For example, in FIG. 3, Node 2 receives a R-APS(SF) generated by Node 3. At 504, the port on which the first control message was received is determined. Continuing the example, port number 1 of Node 2 is determined as the receiving ring port for that R-APS(SF). At 506, whether a flag of the first control message is set is determined. In some embodiments, the flag is a value in a flag field, such as the flag field of the R-APS(SF) protocol data unit (PDU). The flag may be determined as not being set if the value in the flag field is set to "0," for example. Similarly, the flag may be determined as being set if the value in the flag field is set to "1."

If, at the decision of 506, the flag of the first control message is determined as not being set (i.e., the "No" branch), address information of the port determined at 504 is cleared at 508. Clearing the address information may include, for example, flushing MAC addresses or FDB entries associated with the particular port. Continuing the example, because the R-APS(SF) generated by Node 3 and received at Node 2 does not pass through the RPL Owner 310, the flag of the R-APS(SF) is not set, and the address information of port number 1 (i.e., the determined port) of Node 2 is cleared.

If, at the decision of 506, the flag of the first control message is determined as being set (i.e., the "Yes" branch), address information of a port that is not the port determined at 504 is cleared at 510. That is, address information is cleared at a different port of the network device than the port on which it was determined that the first control message was received. Using a different example from FIG. 3, for a R-APS(SF) generated by Node 4 and received at Node 2, that R-APS(SF) would pass through the RPL Owner 310, which sets the flag of the R-APS(SF) before forwarding to Node 2. The R-APS(SF) generated by Node 4 would be received on port number 2 of Node 2. Thus, the flag of the R-APS(SF) is determined as being set, and the address information of port number 1 of Node 2 (i.e., the port that is not the determined receiving port number 2) is cleared.

At 512, address information of another port of the network device is not cleared. For example, address information of the other port of the network device may be maintained. Thus, if address information of the port determined at 504 is cleared at 508, address information of a different port of the network device is not cleared, but is instead maintained, at 512. In the first example of the R-APS(SF) from Node 3, port number 2 of Node 2 is not cleared. However, if address information is cleared at a different port of the network device than the determined port at 510, address information of the determined port is not cleared, but is instead maintained, at 512. Not clearing address information may include, for example, not flushing MAC addresses or FDB entries associated with the particular port, or alternatively, maintaining MAC addresses or FDB entries associated with the particular port. In the second example of the R-APS(SF) from Node 4, port number 2 (i.e., the determined receiving port) of Node 2 is not cleared.

At 514, the first control message is forwarded using the port that is not the determined port. The first control message may be forwarded to a neighbor network device of the plurality of network devices. A flag of the forwarded control message may indicate to the neighbor network device which port of the neighbor network device to clear address information. For example, if the flag of the first control message was determined as not being set at the decision of 506, the first control message with the flag not set is forwarded. Conversely, if the flag of the first control message was determined as being set at the decision of 506, the first control message with the flag set is forwarded. In the above examples, Node 2 forwards the R-APS(SF) from Node 3 with the flag not set to neighbor Node 1, and forwards the R-APS(SF) from Node 4 with the flag set to neighbor Node 3.

At 516, a second control message is received in response to the same failure on the ring. The first control message and the second control message may be received on the same port or different ports of the network device. In some embodiments, the address information of the port cleared at 508 or 510 is again not cleared (i.e., the address information is maintained). In some embodiments, address information is maintained or not cleared at either of the ports of the network device at 518. Thus, in the above examples, address information of neither ring ports of Node 2 is cleared in response to receiving a subsequent R-APS(SF) for the same ring failure, from Node 3 or Node 4.

Figure 6:
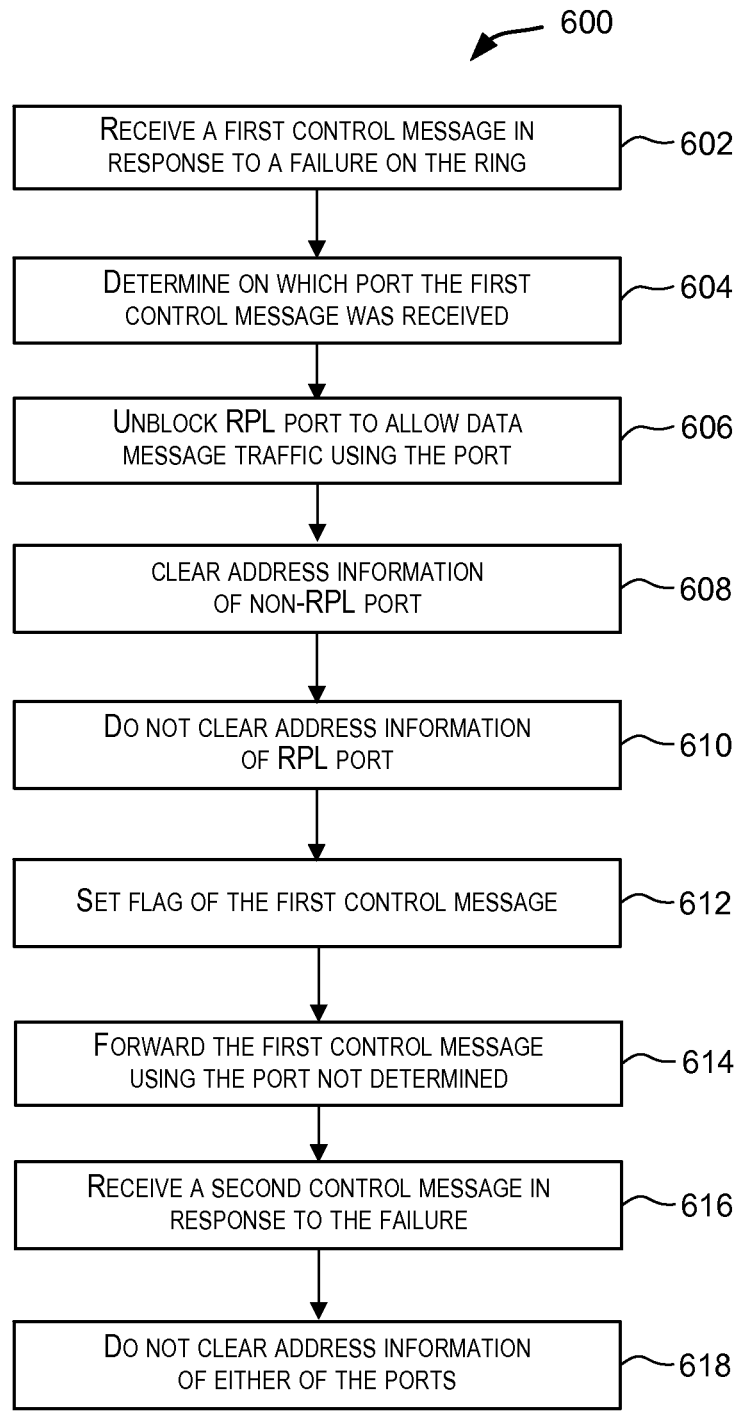
FIG. 6 depicts a simplified flowchart depicting clearing of address information at an RPL Owner network device in response to a failure on the ring.

FIG. 6 depicts a simplified flowchart 600 depicting clearing of address information at an RPL Owner network device in response to a failure on the ring according to an embodiment of the present invention. FIG. 6 will be described with reference to the example of FIG. 3, where Node 1 is the RPL Owner 310. In the exemplary embodiment depicted in FIG. 6, the processing steps are performed by a network device of a plurality of network devices configured in a ring. The network device includes a plurality of ports configurable to receive control messages and a memory configurable to store address information of the ports. Address information of a particular port may identify a set of one or more addresses associated with the particular port. The processing depicted in FIG. 6 may be implemented in software (e.g., code, instructions, program) executed by one or more processing units (e.g., processors, cores), hardware, or combinations thereof. In certain embodiments, the software may be stored on a non-transitory computer-readable storage device or medium. The particular series of processing steps depicted in FIG. 6 is not intended to be limiting.

At 602, a first control message is received in response to a failure on a ring. For example, in FIG. 3, Node 1 receives a R-APS(SF) generated by Node 3. At 604, the port on which the first control message was received is determined. Continuing the example, port number 1 of Node 1 is determined as the receiving ring port for that R-APS(SF). At 606, the RPL port is unblocked to allow data message traffic using the RPL port. Thus, Node 1 unblocks port number 2 to allow data message traffic on the RPL 320.

At 608, address information of a port that is not the RPL port is cleared. That is, address information is cleared at a different port of the network device than the port facing the RPL 320. Referring to FIG. 3, the address information of port number 1 of Node 1 (i.e., the port that is not the RPL port number 2) is cleared.

At 610, address information of the RPL port is not cleared. Not clearing address information may include, for example, not flushing MAC addresses or FDB entries associated with the particular port, or alternatively, maintaining MAC addresses or FDB entries associated with the particular port. In FIG. 3, RPL port number 2 of Node 1 is not cleared.

At 612, a flag of the first control message is set. In some embodiments, the flag is a value in a flag field, such as the flag field of the R-APS(SF) protocol data unit (PDU). The flag may be set by setting the value in the flag field to "1," for example. Thus, Node 1 sets the flag of the first control message.

At 614, the first control message is forwarded using the port that is not the determined port. The first control message may be forwarded to a neighbor network device of the plurality of network devices. A flag of the forwarded control message may indicate to the neighbor network device which port of the neighbor network device to clear address information. The first control message with the flag set by the RPL Owner is forwarded. In FIG. 3, Node 1 forwards the R-APS(SF), generated by Node 3, to neighbor Node 6 but with the flag set.

At 616, a second control message is received in response to the same failure on the ring. The first control message and the second control message may be received on the same port or different ports of the network device. In some embodiments, the address information of the port cleared at 608 is not cleared again (i.e., the address information is maintained). In some embodiments, address information is maintained or not cleared at either of the ports of the RPL Owner at 618. Thus, in FIG. 3, address information of neither ring ports of Node 1 is cleared in response to receiving a subsequent R-APS(SF) for the same ring failure, from Node 3 or Node 4.

Figure 7:
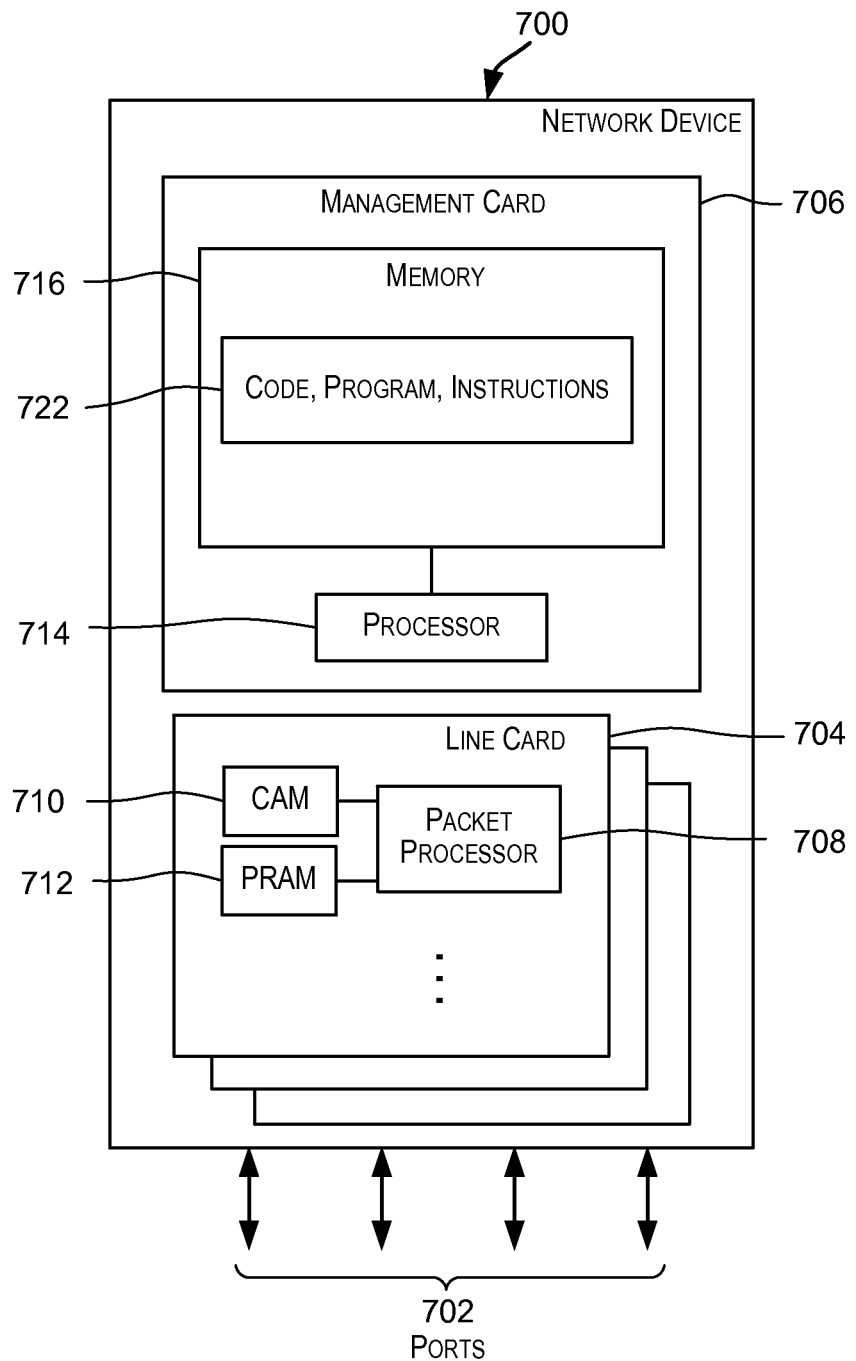
FIG. 7 depicts a simplified block diagram of a network device that may incorporate an embodiment of the present invention.

FIG. 7 depicts a simplified block diagram of a network device 700 that may incorporate an embodiment of the present invention. Network device 700 may be a router or switch that is configured to forward data such as a router or switch provided by Brocade Communications Systems, Inc. of San Jose, Calif.

In the embodiment depicted in FIG. 7, network device 700 comprises a plurality of ports 702 for receiving and forwarding data, including unicast and multicast packets, and multiple cards that are configured to perform processing to facilitate forwarding of the data packets. The multiple cards may include one or more line cards 704 and one or more management cards 706. A card, sometimes also referred to as a blade or module, can be inserted into one of a plurality of slots on the chassis of network device 700. This modular design allows for flexible configurations with different combinations of cards in the various slots of the device according to differing network topologies and switching requirements. The components of network device 700 depicted in FIG. 7 are meant for illustrative purposes only and are not intended to limit the scope of the invention in any manner. Alternative embodiments may have more or less components than those shown in FIG. 7.

Ports 702 represent the I/O plane for network device 700. A port within ports 702 may be classified as an input port or an output port depending upon whether network device 700 receives or transmits a data packet using the port. A port over which a data packet is received by network device 700 is referred to as an input port. A port used for communicating or forwarding a data packet from network device 700 is referred to as an output port. A particular port may function both as an input port and an output port. A port may be connected by a link or interface to a neighboring network device or network. For example, a port may be a ring port connected by a link to a neighbor network device, where the neighbor network device and the network device 700 are nodes of an ERP ring. Ports 702 may be capable of receiving and/or transmitting different types of data traffic including multicast data traffic at different speeds including 1 Gigabit/sec, 10 Gigabits/sec, 40 Gigabits/sec, or more. In some embodiments, multiple ports of network device 700 may be logically grouped into one or more trunks.

Upon receiving a data packet via an input port, network device 700 is configured to determine an output port for the packet for transmitting the data packet from the network device to another neighboring network device or network. Within network device 700, the packet is forwarded from the input port to the determined output port and transmitted from network device 700 using the output port. In one embodiment, forwarding of packets from an input port to an output port is performed by one or more line cards 704.

Line cards 704 represent the data forwarding plane of network device 700. Each line card 704 may comprise one or more packet processors 708 that are programmed to perform forwarding of data packets from an input port to an output port. A packet processor on a line card may also be referred to as a line processor. Each packet processor 708 may have associated memories to facilitate the packet forwarding process. In one embodiment, as depicted in FIG. 7, each packet processor 708 may have an associated content addressable memory (CAM) 710 and a RAM 712 for storing forwarding parameters (RAM 712 may accordingly also be referred to as a parameter RAM or PRAM). In one embodiment, for a packet received via an input port, the packet is provided to a packet processor 708 of a line card 704 coupled to the input port. The packet processor receiving the packet is configured to determine an output port of network device 700 to which the packet is to be forwarded based upon information extracted from the packet. The extracted information may include, for example, the header of the received packet. In one embodiment, a packet processor 708 is configured to perform a lookup in its associated CAM 710 using the extracted information. A matching CAM entry then provides a pointer to a location in the associated PRAM 712 that stores information identifying how the packet is to be forwarded within network device 700. Packet processor 708 then facilitates forwarding of the packet from the input port to the determined output port.

Since processing performed by a packet processor 708 needs to be performed at a high packet rate in a deterministic manner, packet processor 708 is generally a dedicated hardware device configured to perform the processing. In one embodiment, packet processor 708 is a programmable logic device such as a field programmable gate array (FPGA). Packet processor 708 may also be an ASIC.

Management card 706 is configured to perform management and control functions for network device 700 and thus represents the management plane for network device 700. In one embodiment, management card 706 is communicatively coupled to line cards 704 and includes software and hardware for controlling various operations performed by the line cards. In one embodiment, a single management card 706 may be used for all the line cards 704 in network device 700. In alternative embodiments, more than one management cards may be used, with each management card controlling one or more line cards 704.

A management card 706 may comprise a processor 714 (also referred to as a management processor) that is configured to perform functions performed by management card 706 and associated memory 716. Memory 716 is configured or adapted to store various programs/code/instructions 722 and data constructs that are used for processing performed by processor 714 of management card 706. In one embodiment, processor 714 is a general purpose microprocessor such as a PowerPC, Intel, AMD, or ARM microprocessor, operating under the control of software 722 stored in associated memory 716.

Various embodiments described above can be realized using any combination of dedicated components and/or programmable processors and/or other programmable devices. The various embodiments may be implemented only in hardware, or only in software, or using combinations thereof. For example, the software may be in the form of instructions, programs, etc. stored in a computer-readable memory and may be executed by a processing unit, where the processing unit is a portion of a processor, a processor, a collection of processors, a percentage of a core of a processor, a core of a processor, a set of cores, etc. An embodiment may be implemented by one or more virtual machines (VMs) executing on a network device. Resources allocated to the VMs can be of various types such as a processing resource (e.g., processing units provided by the device), a system memory resource, a non-volatile memory resource, an input/output (I/O) resource, ports of the device, bandwidth resource, and the like. In certain embodiments, the various processing described above, including the processing depicted in the flowcharts in FIG. 5 and FIG. 6 can be performed in software without needing changes to existing device hardware (e.g., router hardware), thereby increasing the economic viability of the solution. Since certain inventive embodiments can be implemented entirely in software, it allows for quick rollouts or turnarounds along with lesser capital investment, which further increases the economic viability and attractiveness of the solution.

The various processes described herein can be implemented on the same processor or different processors in any combination, with each processor having one or more cores. Accordingly, where components or modules are described as being adapted to, configured to, or configurable to perform a certain operation, such configuration can be accomplished, e.g., by designing electronic circuits to perform the operation, by programming programmable electronic circuits (such as microprocessors) to perform the operation, by providing software or code instructions that are executable by the component or module (e.g., one or more processors) to perform the operation, or any combination thereof. Processes can communicate using a variety of techniques including but not limited to conventional techniques for interprocess communication, and different pairs of processes may use different techniques, or the same pair of processes may use different techniques at different times. Further, while the embodiments described above may make reference to specific hardware and software components, those skilled in the art will appreciate that different combinations of hardware and/or software components may also be used and that particular operations described as being implemented in hardware might also be implemented in software or vice versa.

The various embodiments are not restricted to operation within certain specific data processing environments, but are free to operate within a plurality of data processing environments. Additionally, although embodiments have been described using a particular series of transactions, this is not intended to be limiting.

Thus, although specific invention embodiments have been described, these are not intended to be limiting. Various modifications and equivalents are within the scope of the following claims.

What is claimed is:

1. A network device, comprising:
   a first port and a second port configured to connect the network device to a major ring network;
   a third port configured to connect the network device to a minor ring network; and
   a memory configured to store address information for each of the first port, the second port, and the third port, wherein the address information for each of the first port, the second port, and the third port includes one or more network addresses for one or more other network devices in the major ring network or the minor ring network;
   wherein the network device is configured to:
      determine that a control message received at the third port indicates a failure in the minor ring network, the control message including a flag providing information about a path taken by the control message in the minor ring network, the flag indicating whether the path includes a network device designated as an owner of the minor ring network;
      select, using the flag, a port from among the first port and the third port; and
      clear the one or more network addresses stored in the memory for the selected port.

2. The network device of claim 1, wherein the network device is configured to select the third port upon determining that the flag has first value.

3. The network device of claim 1, wherein the network device is configured to selecting the first port upon determining that the flag has a second value.

4. The network device of claim 1, wherein the first port and the third port are each associated with a first label and the second port is associated with a second label.

5. The network device of claim 1, wherein the network device is configured to disable forwarding of the control message.

6. The network device of claim 1, wherein the network device is further configured to generate a second control message for sending to another network device in the major ring network, the second control message indicating a flush event.

7. The network device of claim 3, wherein the second value indicates that the path taken by the control message included the network device designated as the minor ring owner.

8. A method comprising:
   determining, by a network device, that a control message received at a third port of a network device indicates a failure in a minor ring network, the network device including a first port configured to connect the network device to a major ring network and a second port configured to connect the network device to the major ring network, wherein the third port is configured to connect the network device to the minor ring network, the control message including a flag providing information about path taken by the control message in the minor ring network, the flag indicating whether the path includes a network device designated as an owner of the minor ring network;
   selecting, by a network device, a port from among the first port and the third port using the flag; and
   clearing, by the network device, address information stored at the network device for the selected port, the address information including one or more network addresses for one or more other network devices in the major ring network or the minor ring network.

9. The method of claim 8, wherein selecting a port comprises selecting the third port upon determining that the flag has a first value.

10. The method of claim 8, wherein selecting a port comprises selecting the first port upon determining that the flag has a second value.

11. The method of claim 8, wherein the first port and the third port are each associated with a first label and the second port is associated with a second label.

12. The method of claim 8, further comprising disabling, by the network device, forwarding of the control message.

13. The method of claim 8, further comprising generating a second control message for sending to another network device in the major ring network, the second control message indicating a flush event.

14. The method of claim 10, wherein the second value indicates that the path taken by the control message included the network device designated as the minor ring owner.

15. A non-transitory computer-readable storage memory, storing a plurality of instructions executable by one or more processors, the plurality of instructions comprising:
   instructions causing at least one processor from the one or more processors to determine that a control message received at a third port of a network device indicates a failure, the network device including a first port configured to connect the network device to a major ring network and a second port configured to connect the network device to the major ring network, wherein the third port is configured to connect the network device to the minor ring network, and wherein the control message includes a flag providing information about a path taken by the control message in the minor ring network, the flag indicating whether the path includes a network device designated as an owner of the minor ring network;
   instructions causing at least one processor from the one or more processors to select a port from among the first port and the third port using the flag; and
   instructions causing at least one processor from the one or more processors to clear address information stored at the network device for the selected port, the address information including one or more network addresses for one or more other network devices in the major ring network or the minor ring network.

16. The non-transitory computer-readable storage memory of claim 15, wherein the instructions causing at least one processor from the one or more processors to select a port comprise:
  instructions causing at least one processor from the one or more processors to select the third port upon determining that the flag has a first value.

17. The non-transitory computer-readable storage memory of claim 15, wherein the instructions causing at least one processor from the one or more processors to select a port comprise:
  instructions causing at least one processor from the one or more processors to select the first port upon determining that the flag has a second value.

18. The non-transitory computer-readable storage memory of claim 15, wherein the first port and the third port are each associated with a first label and the second port is associated with a second label.

19. The non-transitory computer-readable storage memory of claim 15, wherein the plurality of instructions further comprise instructions causing at least one processor from the one or more processors to disable forwarding of the control message.

20. The non-transitory computer-readable storage memory of claim 15, wherein the plurality of instructions further comprise:
  instructions causing at least one processor from the one or more processors to generate a second control message for sending to another network device in the major ring network, the second control message indicating a flush event.

* * * * *

UNITED STATES PATENT AND TRADEMARK OFFICE
CERTIFICATE OF CORRECTION

PATENT NO. : 9,444,641 B2  
APPLICATION NO. : 14/018713  
DATED : September 13, 2016  
INVENTOR(S) : Sandeep Kulambi It is certified that error appears in the above-identified patent and that said Letters Patent is hereby corrected as shown below:

In the Claims

In Claim 3, Column 21, Line 51, please delete "selecting" and insert --select--.

Signed and Sealed this  
Thirteenth Day of March, 2018

Andrei Iancu  
*Director of the United States Patent and Trademark Office*